(12) United States Patent
Rubin et al.

(10) Patent No.: US 10,938,575 B2
(45) Date of Patent: Mar. 2, 2021

(54) SIGNATURE COMPRESSION FOR HASH-BASED SIGNATURE SCHEMES

(71) Applicant: Amazon Technologies, Inc., Seattle, WA (US)

(72) Inventors: Gregory Alan Rubin, Seattle, WA (US); Matthew John Campagna, Bainbridge Island, WA (US); Nicholas Alexander Allen, Kirkland, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 16/716,037

(22) Filed: Dec. 16, 2019

(65) Prior Publication Data

US 2020/0119928 A1 Apr. 16, 2020

Related U.S. Application Data

(62) Division of application No. 15/399,452, filed on Jan. 5, 2017, now Pat. No. 10,511,445.

(51) Int. Cl.
| | |
|---|---|
| *H04L 29/06* | (2006.01) |
| *H04L 9/32* | (2006.01) |
| *H04L 9/08* | (2006.01) |

(52) U.S. Cl.
CPC .......... *H04L 9/3247* (2013.01); *H04L 9/0861* (2013.01); *H04L 63/126* (2013.01)

(58) Field of Classification Search
None
See application file for complete search history.

(56) References Cited

U.S. PATENT DOCUMENTS

| | | | |
|---|---|---|---|
| 9,705,730 | B1 | 7/2017 | Petri et al. |
| 10,304,143 | B2 | 5/2019 | Kasper et al. |
| 10,417,217 | B2 | 9/2019 | Pierce et al. |
| 2012/0047284 | A1 | 2/2012 | Tarkoma |
| 2016/0260091 | A1 | 9/2016 | Tobias |
| 2016/0301531 | A1 | 10/2016 | Finlow-Bates |
| 2016/0330034 | A1 | 11/2016 | Back et al. |
| 2017/0031676 | A1 | 2/2017 | Cechetti et al. |
| 2017/0126702 | A1 | 5/2017 | Krishnamurthy |
| 2017/0132621 | A1 | 5/2017 | Miller et al. |
| 2017/0163425 | A1* | 6/2017 | Kaliski, Jr. ........... H04L 9/3247 |
| 2017/0318008 | A1 | 11/2017 | Mead |
| 2017/0331803 | A1 | 11/2017 | Parello et al. |
| 2018/0025167 | A1 | 1/2018 | Bohli et al. |
| 2018/0039667 | A1 | 2/2018 | Pierce et al. |

(Continued)

OTHER PUBLICATIONS

U.S. Appl. No. 15/389,991, filed Dec. 23, 2016.

(Continued)

*Primary Examiner* — Andrew J Steinle
(74) *Attorney, Agent, or Firm* — Davis Wright Tremaine LLP

(57) ABSTRACT

A digital signature over a message may be compressed by determining a plurality of values based at least in part on the message. A mapping of the plurality of values over a digital signature scheme may be used to determine a value from which a portion of the compressed digital signature is decompressible by cryptographically deriving one or more components of the uncompressed digital signature. A public key may be used to verify the authenticity of the compressed digital signature and message.

20 Claims, 8 Drawing Sheets

(56) References Cited

U.S. PATENT DOCUMENTS

| | | |
|---|---|---|
| 2018/0053182 A1 | 2/2018 | Mokhasi |
| 2018/0063139 A1* | 3/2018 | Day .................... H04L 63/123 |
| 2018/0088928 A1 | 3/2018 | Smith et al. |
| 2018/0089465 A1 | 3/2018 | Winstrom et al. |
| 2018/0183774 A1 | 6/2018 | Campagna et al. |
| 2018/0189312 A1* | 7/2018 | Alas ...................... G06F 21/64 |
| 2019/0108350 A1 | 4/2019 | Bohli et al. |
| 2019/0251648 A1 | 8/2019 | Liu et al. |

OTHER PUBLICATIONS

U.S. Appl. No. 15/402,063, filed Jan. 9, 2017.

Dang, "Recommendation for Applications Using Approved Hash Algorithms," National Institute of Standards and Technology (NIST) Special Publication 800-107 Revision 1, Aug. 2010, retrieved Nov. 24, 2015, http://csrc.nist.gov/publications/nistpubs/800-107-rev1/sp800-107-rev1.pdf, 25 pages.

Biryukov et al., "Equihash: Asymmetric Proof-of-Work Based on the Generalized Birthday Problem," Cryptology ePrint Archive Report 2015/946, 16 pages.

Biryukov et al.,"Egalitarian Computing," 25th USENIX Security Symposium, Aug. 10-12, 2016, pp. 315-326.

Coelho, "An (Almost) Constant-Effort Solution-Verification Proof-of-Work Protocol based on Merkle Trees (extended and colored version of [7])," 1st International Conference on Progress in Cryptology, Jun. 2008, 8 pages.

\* cited by examiner

US 10,938,575 B2

SIGNATURE COMPRESSION FOR HASH-BASED SIGNATURE SCHEMES

CROSS-REFERENCE TO RELATED APPLICATIONS

This application is a divisional of U.S. patent application Ser. No. 15/399,452, filed Jan. 5, 2017, entitled "SIGNATURE COMPRESSION FOR HASH-BASED SIGNATURE SCHEMES," the disclosure of which is hereby incorporated herein in its entirety.

BACKGROUND

In computer systems, digital signatures may be used to verify the authenticity of a message or document. Valid digital signatures provide recipients with assurances as to the authenticity and integrity of the message. Digital signatures are employed in a variety of applications, such as in the use of digital communications between multiple parties, as well as in storage and backup systems. However, the use of digital signatures has drawbacks. Digital signatures may require the utilization of additional data which much be transmitted, stored, or processed in addition to a message or document with which the digital signature is associated with, which presents additional challenges to many computer systems which may have limited storage, bandwidth, or processing capabilities. As an example, cryptographic algorithms for generating digital signatures based on signature schemes that are considered to be secure for future developments in computing generally have large signature sizes that present additional challenges with regard to computer systems that store, transmit, and/or process digital signatures.

BRIEF DESCRIPTION OF THE DRAWINGS

Various techniques will be described with reference to the drawings, in which.

DETAILED DESCRIPTION

Figure 1:
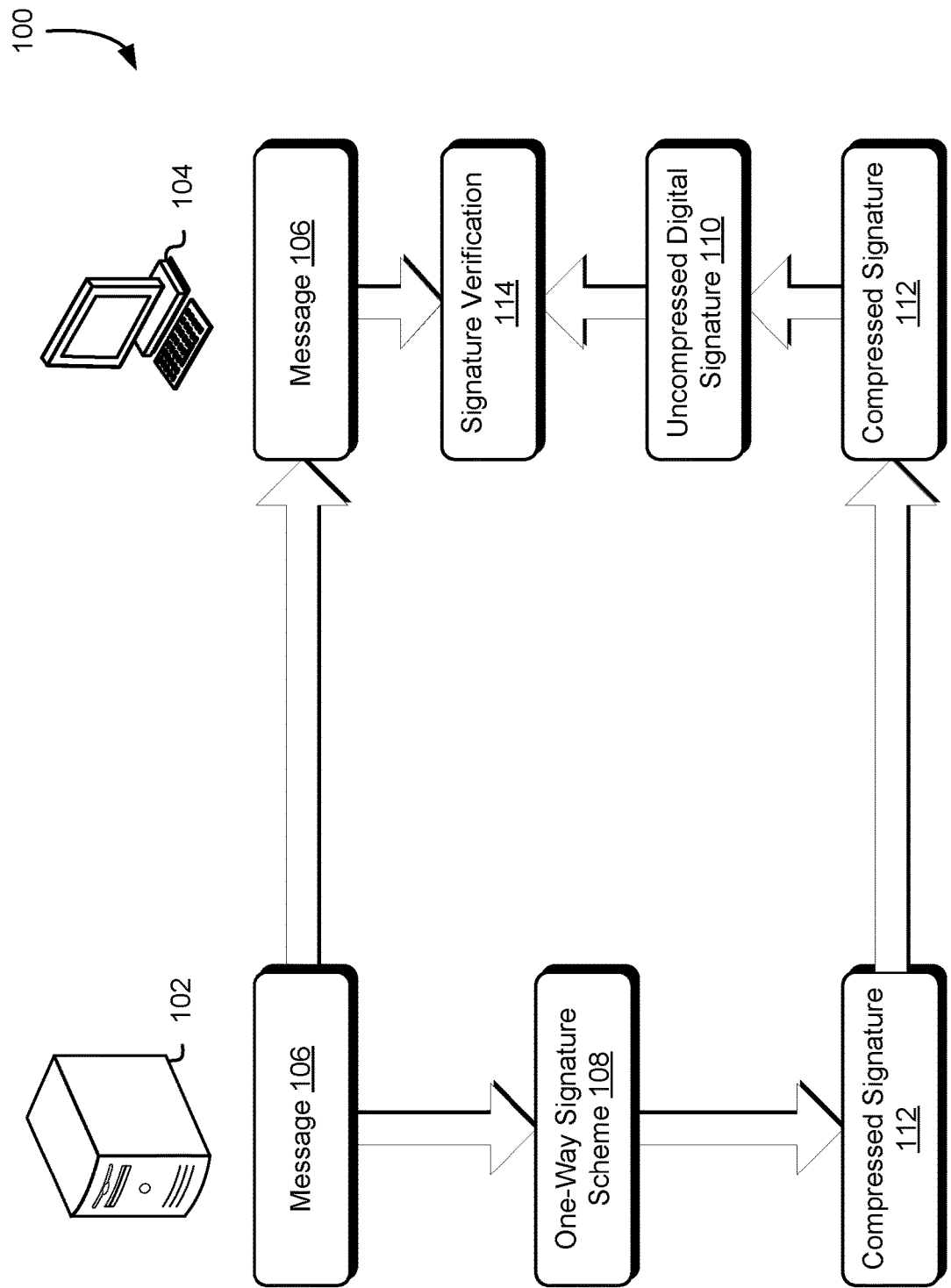
FIG. 1 shows an illustrative example of an environment in which various embodiments may be practiced.

This document describes techniques for a tree-based secret key derivation scheme that can be used in a signature compression method for one-time hash-based signature schemes. The compressed signatures can be used to provide the same security assurances as the uncompressed signature, while providing, on average, a reduction in signature sizes. In various examples, a digital signature is generated using a hash-based signature scheme such a Lamport-Diffie One-Time Signature (LD-OTS) scheme or a Winternitz One-Time Signature (W-OTS) scheme and compressed using techniques that are described below in detail.

A computer system may generate, in accordance with a one-time hash-based signature scheme such as LD-OTS or W-OTS, a compressed digital signature. A one-time hash-based signature scheme may refer to a scheme for generating digital signatures wherein each signing key may be used to securely sign one message. The system may generate two secret values which are respectively used as root nodes of two binary hash trees. Child nodes of each binary tree may be deterministically generated using a pseudo-random function so that both hash trees have a leaf node corresponding to each bit of the hashed message. For example, if a hashed message has a bitlength of 8-bits, both trees would have eight leaf nodes. The public key may be generated by concatenating the hash of each of the sixteen leaf nodes. Each leaf node of a tree corresponds to a particular bit of the hashed message (e.g., the leftmost leaf node corresponds to the first bit of the hashed message and the rightmost leaf node corresponds to the last bit of the hashed message) and each tree corresponds to the value of a particular bit. Continuing from the previous example, if the first bit of the hashed message has a binary value of "1" then the leftmost leaf node may be selected from the first hash tree, and if the second bit of the hashed message then has a binary value of "0" then the second-to-the-left leaf node may be selected from the second hash tree, and so on.

A computer system may generate a compressed digital signature using a one-time hash-based signature scheme. For example, the system may use a cryptographic hash function to hash the message and generate a hashed message or message digest. The hashed message may, for example, be generated using a SHA-256 or SHA-512 hashing algorithm. The first two bits of the hash message may be scanned and if they match in value (e.g., the hashed message starts with a binary value of "00" or "11"), the system may record: an indicator bit that indicates a successful compression of the sub-string; and a parent node of two leaf nodes of the tree selected based on the binary value. If the first two bits of the hash message do not start with consecutive matching bits, then the system may record: a different indicator bit that indicates no compression space savings; the value of the first leaf node of the hash tree corresponding to the value of the first bit; and the value of the second leaf node of the other hash tree (i.e., the hash tree corresponding to the value of the second bit). This compression performed against the first two bits of the hashed message may be performed for consecutive bits of the hashed message until the entire hashed message is compressed, thereby generating the compressed digital signature.

Another computer system receiving the message and a corresponding compressed digital signature may decompress and verify the authenticity of the received compressed digital signature. The computer system may generate a hash of the message, for example, using a SHA-256 or SHA-512 hashing algorithm. The system may obtain the first two bits of the generated hash message. The system may also obtain the first indicator bit of the compressed message and verify that the value of the indicator bit matches the expected value based on the first two bits of the generated hash message. For example, if an indicator bit value of "0" indicates that the first two bits are the same value, then the system verification may include checking that the first two bits obtained from the generated hash message are "00" or "11". If the indicator bit indicates that the bits do not have the same value, the system may obtain the first leaf node value and the second leaf node value directly (e.g., by reading and copying a memory block) from the compressed digital signature. However, if the indicator bit indicates that the bits have the same value, the system may obtain the parent node value and derive (e.g., using a pseudo-random function) the values for the first leaf node and the second leaf node from the parent node. The decompression performed against the first two bits may be repeated for successive bits of the hashed message until the entire uncompressed digital signature is generated. An authentic public key may be obtained (e.g., from a trusted certificate authority) and used to verify the uncompressed digital signature and received message.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an environment in which various embodiments can be implemented. The computing environment 100 illustrates a service provider 102 and a client 104 performing a digital signature compression in accordance to techniques described in this document and also a signature decompression and verification in accordance with this document. The service provider 102 may be one or more computing resources that may be used to access computing resources, for example, via an application programming interface (API) request.

A client 104 may be a computer component or subsystem that interacts with the service provider 102. The client computer system 104 may be implemented using software, hardware, or a combination of both, and may be used for a variety of purposes. The client 104 may be configured to make requests to obtain access to computing resources of the service provider. For example, a client may request access to obtain one or more computing resources, such as files stored within a backend storage system of the service provider. The client may also request access to perform operations wholly within the service. For example, a client may request that the service generate a set of resources (e.g., compressing a set of data files located within a backend storage system) which the client may later obtain. In some embodiments, the client 104 may be a subsystem of the service provider 102, may be hosted entirely within the service provider 102 (e.g., where the client 104 is running on a virtual machine instance hosted by the service provider 102), may be a second service provider, or any combination thereof.

The message 106 shown in FIG. 1 may be data that a service provider 102 provides in response to a request by a client 104. In some embodiments, the service provider 102 may generate a compressed signature as a part of all messages it generates to fulfill requests, whereas in other embodiments the service provider 102 may generate a compressed signature only for some (but not all) messages that it generates to fulfill requests. In some embodiments, the client 104 may specify whether to generate a digital signature, whether to compress the digital signature, and the like. In some embodiments, the message 106 is made available to the client, either with a corresponding compressed digital signature 112 or separate from the corresponding compressed digital signature. A message made available directly (e.g., as part of a response to an API request) or provided implicitly (e.g., a reference is provided such that the reference may be used to obtain the key and signature pre-fix value from another source, such as a URL address or Uniform Resource Identifier (URI)).

The service provider 102 may generate, in accordance with a one-time hash-based signature scheme 108, a compressed digital signature 112. A one-time hash-based signature scheme may refer to a scheme for generating digital signatures wherein each signing key may be used to securely sign one message. In some embodiments, a one-time hash-based signature scheme may be used to sign multiple messages, but the signing of multiple signatures may result in additional properties of the signature scheme being made available such that adversaries may have additional knowledge that may be used as part of a cryptographic attack. In some cases, the additional knowledge may make an attack marginally more likely to be successful, but may still be considered infeasible or intractable. A one-time hash-based signature scheme may be a type of digital signature scheme. A digital signature scheme may refer to a scheme or method for generating digital signatures. Examples of one-time hash-based signature schemes include Lamport-Diffie One-Time Signature Scheme (LD-OTS) or Winternitz Winternitz One-Time Signature (W-OTS) scheme.

In some embodiments, the service provider 102 may generate a compressed digital signature 112 using a one-time hash-based signature scheme 108. For example, the service provider 102 may use a cryptographic hash function to hash the message and cryptographically derive a hashed message or message digest. The hashed message may, for example, be cryptographically derived using a SHA-256 or SHA-512 hashing algorithm. The system may generate two secret values which are respectively used as root nodes of two binary hash trees. Child nodes of each binary tree may be deterministically generated using a pseudo-random function so that both hash trees have a leaf node corresponding to each bit of the hashed message. For example, if a hashed message has a bitlength of 8-bits, both trees would have eight leaf nodes. The public key may be generated by concatenating the hash of each of the sixteen leaf nodes. Each leaf node of a tree corresponds to a particular bit of the hashed message (e.g., the leftmost leaf node corresponds to the first bit of the hashed message and the rightmost leaf node corresponds to the last bit of the hashed message) and each tree corresponds to the value of a particular bit. Continuing from the previous example, if the first bit of the hashed message has a binary value of "1" then the leftmost leaf node may be selected from the first hash tree, and if the second bit of the hashed message then has a binary value of "0" then the second-to-the-left leaf node may be selected from the second hash tree, and so on.

The first two bits of the hash message may be scanned and if they match in value (e.g., the hashed message starts with a binary value of "00" or "11"), the system may record: an indicator bit that indicates a successful compression of the sub-string; and a parent node of two leaf nodes of the tree selected based on the binary value. If the first two bits of the hash message do not start with consecutive matching bits, then the system may record: a different indicator bit that indicates no compression space savings; the value of the first leaf node of the hash tree corresponding to the value of the first bit; and the value of the second leaf node of the other hash tree (i.e., the hash tree corresponding to the value of the second bit). This compression performed against the first two bits of the hashed message may be performed for consecutive bits of the hashed message until the entire hashed message is compressed, thereby generating the compressed digital signature 112. Note that many other methods of generating compressed digital signatures are described below in connection with FIGS. 2-6 and may be applied to FIG. 1 as well.

A client 104 may receive the message 106 and a corresponding compressed digital signature 112. The client 104 may, for example, receive the message 106 and compressed digital signature 112 from separate responses and may have received one or both over a network such as an intranet, the Internet, a cellular network, a local area network, a satellite network, or some combination thereof. In some embodiments, the client 104 may verify the authenticity and/or integrity of the message 106 using the compressed digital signature 112. Authenticity may refer to assurances that the message was created by a party purporting to be the author of the message. Integrity may refer to assurances that the received message was not modified either intentionally (e.g., by a malicious party) or unintentionally (e.g., as a result of signal loss during transmission) from its original form when the message was transmitted.

In some embodiments, the client 104 may obtain the message, the compressed digital signature, and an authentic public key (e.g., from a trusted certificate authority). The client 104 and service provider 102 may use the same hashing algorithm. The system may obtain the first two bits of the generated hash message. The system may also obtain the first indicator bit of the compressed message and verify that the value of the indicator bit matches the expected value based on the first two bits of the generated hash message. For example, if an indicator bit value of "0" indicates that the first two bits are the same value, then the system verification may include checking that the first two bits obtained from the generated hash message are "00" or "11". If the indicator bit indicates that the bits do not have the same value, the system may obtain the first leaf node value and the second leaf node value directly (e.g., by reading and copying a memory block) from the compressed digital signature. However, if the indicator bit indicates that the bits have the same value, the system obtains the parent node value and cryptographically derives the first leaf node value and the second leaf node value. The decompression performed against the first two bits may be repeated for successive bits of the hashed message until the entire uncompressed digital signature 110 is generated. The uncompressed digital signature 110 should include: either the value of the leftmost node of the first hash tree or the value of the leftmost node of the right hash tree (but not both), the value selected based on the value of the first bit of the generated hash message; either the value of the second-to-left node of the first hash tree or the value of the second-to-left node of the second hash tree, the value selected based on the value of the second bit of the generated hash message; and so on, for each bit of the hashed message. The public key may include all the leaf node values and may be used as part of a signature verification 114 process to determine that the uncompressed digital signature 110 and message are authentic—that is, that neither the received message 106 nor the received compressed digital signature 112 were modified inflight, either inadvertently (e.g., due to signal loss) or maliciously (e.g., an adversary intercepted the data during transmission and either modified the message or the signature). In some embodiments, the signature verification 114 may include selecting, for each bit of the hashed message, a public key value for that bit that corresponds to the value of the bit, and comparing the selected public key value with the value of a component of the uncompressed digital signature. The signature verification 114 may indicate a successful verification if the values of the selected public key and the correspond component of the uncompressed digital signature match for each bit of the hashed message. Note that many other methods of decompressing the compressed digital signatures and verifying compressed digital signatures are described below in connection with FIGS. 2-6 and may be applied to FIG. 1 as well.

A cryptographic derivation may refer to using a pseudo-random function, cryptographic hash function (e.g., SHA-256), encryption algorithm, or other such functions that may be used to deterministically generate an output based on an input. In some embodiments, a cryptographic derivation may be one-way such that the output of a cryptographic derivation, it is no more likely that any value in the domain of inputs to the cryptographic derivation was more likely to have generated the derived value than another value in the domain of inputs. For example, child nodes of a hash tree may be cryptographically derived from a parent node using a pseudo-random function such as in the manner described below in connection with FIG. 2.

It should be noted that in this disclosure, a digital signature may refer to a compressed digital signature 112, an uncompressed digital signature 110, or a decompressed digital signature. More broadly, a digital signature may, in some embodiments, refer to information that may be used to perform an authentication process. For example, a compressed digital signature 112 may be used as part of an authentication process by perform a decompression on the compressed digital signature 112, generating a digital signature over a message using a cryptographic algorithm (e.g., a pseudo-random function), and comparing the generated digital signature with the decompressed digital signature.

Figure 2:
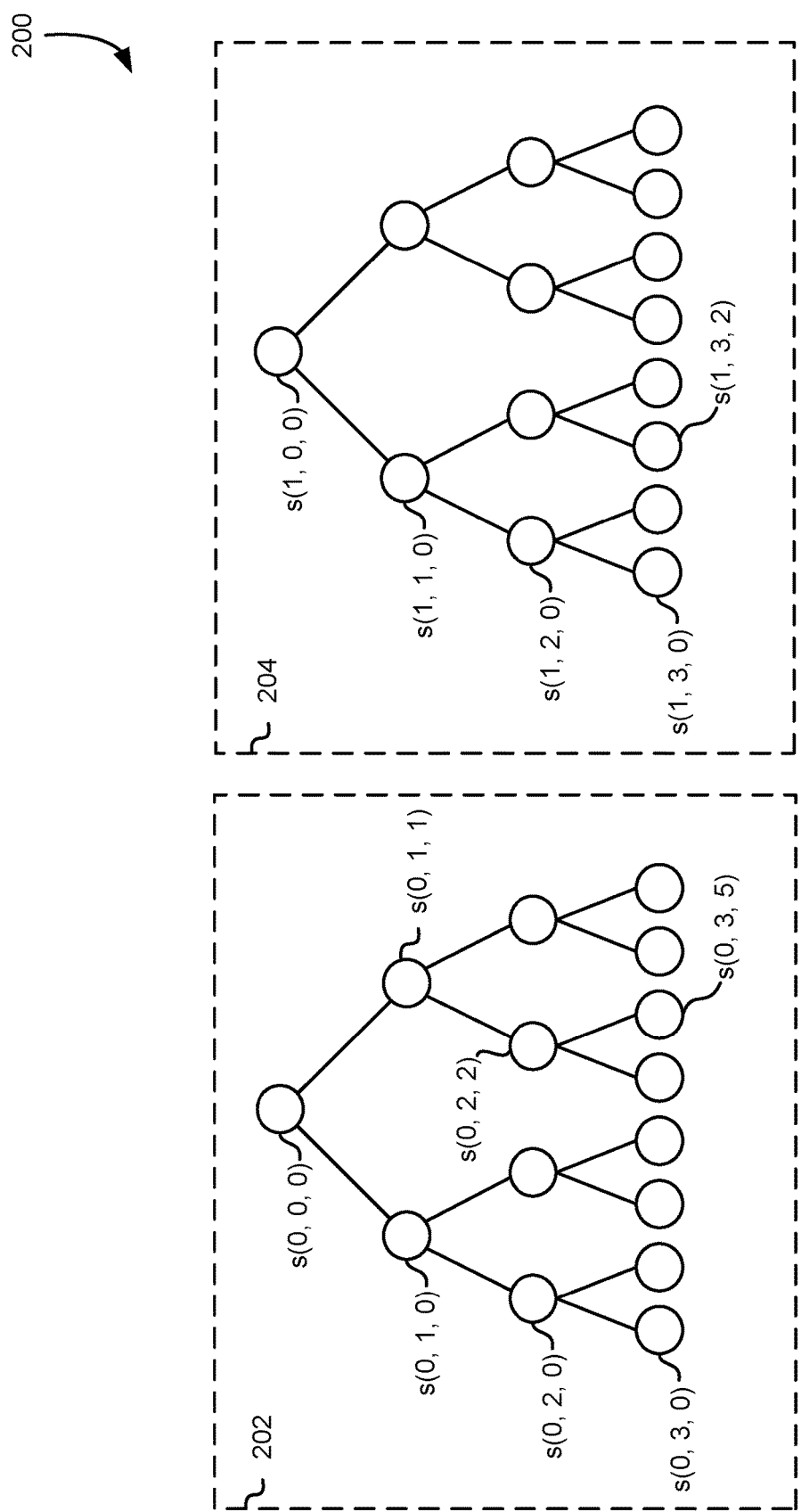
FIG. 2 shows an illustrative example of a secret key generation scheme that may be used to generate compressed signatures.

FIG. 2 illustrates an example of a secret key generation scheme that uses binary trees. The binary trees may be used to generate compressed digital signatures which may also be verified using techniques described herein. A diagram 200 includes a first binary tree 202 used to generate secret keys and a second binary tree 204 used to generate secret keys. The binary trees may be used to generate a compressed digital signature using a compression algorithm.

A computer system such as those described above in connection with FIG. 1 may generate two secret values $s(0, 0, 0)$ and $s(1, 0, 0)$ that may be used as roots for the tree. These secret values will form the private key, $SK=\{s(0, 0, 0), s(1, 0, 0)\}$. It should be noted that while the two secret values $s(0, 0, 0)$ and $s(1, 0, 0)$ may be generated separately, it may also be the case that the secret values are derived from a joint secret. For illustrative purposes, the process for generating the first binary tree 202 for 8-bit messages will be described below. The process may be repeated in the same or similar manner to generate the second binary tree 204. Additionally, messages of variable length (e.g., 256-bit messages, 512-bit messages) may be generated in accordance with the principles that are described herein.

Starting from the secret value $s(0, 0, 0)$, a first child node may be generated using a pseudo-random function or hash function from a secret value. Generally speaking, a pseudo-random function may generally refer to a function that deterministically maps a domain of inputs to a range of outputs in a manner that appears truly random. Thus, given the output of a pseudo-random function, it should be no more likely that any value in the domain of inputs was more likely to have generated the output than another value in the domain. Additionally, because pseudo-random functions deterministically maps a domain of inputs to a range of outputs, the same input will generate the same output. In some embodiments, a pseudo-random function PRF may be configured to receive three inputs to generate an output—PRF(s, additional_info, i) where s refers to a secret value such as s(0, 0, 0) or s(1, 0, 0); additional_info may refer to additional info that is used to control output of the pseudo-random function; and i, which may be an index that is also used to control the output of the pseudo-random function. It should be noted that while a pseudo-random function has been described thus far, the same principles may be applied to hash functions which may, generally speaking, be used in place of pseudo-random functions to deterministically generate a range of outputs based on a specific set of input parameters.

The notation of the child nodes shown in FIG. 2 are described using the following nomenclature:
s(tree, depth, index): the value of a node, generated using a pseudo-random function;
tree: identifies which tree the node belongs to;
depth: identifies the depth of the node; and
index: the 0-indexed position of the node at a given depth.
As an example, consider the following value s(0, 3, 5)—the first parameter, a 0, indicates that the node corresponds to the first binary tree 202 having root s(0, 0, 0); the second parameter, a 3, refers to the depth of the tree, which indicates that there are three edges from the root s(0, 0, 0) to the node—additionally, in a binary tree, it indicates that there are at most $2^3=8$ nodes at that depth; the third parameter, a 5, refers to the 0-indexed position of the node—that is, that it is $6^{th}$ node, counting from left to right, at a depth of 3. For all non-root nodes, the left-most node will have an index value of zero.

In an embodiment in accordance with the diagram 200 shown in FIG. 2, binary trees for an 8-bit message is shown. A number of leaf values equal to twice the number of bits in the message will be derived from the two secret values s(0, 0, 0) and s(1, 0, 0), the values being the values of the leaf nodes of the binary trees. A secret value s(0, 0, 0) is generated, the secret value, which may be generated at random (e.g., by a pseudorandom number generator). After generating the root s(0, 0, 0), $2^1=2$ child nodes are generated. The left child node off of the root s(0, 1, 0) may be generated such that s(0, 1, 0)=PRF(s(0, 0, 0), 1, 0) and the right child node off of the root s(0, 1, 1)=PRF(s(0, 0, 0), 1, 1).

After generating the two child nodes off the root, $2^2=4$ grandchild nodes are generated off of the child nodes. The left child s(0, 1, 0) will be used to derive values for two grandchildren, s(0, 2, 0)=PRF(s(0, 1, 0), 2, 0) and s(0, 2, 1)=PRF(s(0, 1, 0), 2, 1) whereas the right child s(0, 1, 1) is used to derive values for the two other grandchildren s(0, 2, 2)=PRF(s(0, 1, 1), 2, 2) and s(0, 2, 3)=PRF(s(0, 1, 1), 2, 3).

Next, the $2^3=8$ grandchildren leaf nodes are generated:

| Node | Value |
| --- | --- |
| s(0, 3, 0) | PRF(s(0, 2, 0), 3, 0) |
| s(0, 3, 1) | PRF(s(0, 2, 0), 3, 1) |
| s(0, 3, 2) | PRF(s(0, 2, 0), 3, 2) |
| s(0, 3, 3) | PRF(s(0, 2, 0), 3, 3) |
| s(0, 3, 4) | PRF(s(0, 2, 0), 3, 4) |
| s(0, 3, 5) | PRF(s(0, 2, 0), 3, 5) |
| s(0, 3, 6) | PRF(s(0, 2, 0), 3, 6) |
| s(0, 3, 7) | PRF(s(0, 2, 0), 3, 7) |

This process is repeated for the second hash tree 204 having the root s(1, 0, 0) to generate another 8 grandchildren leaf nodes. The grandchild leaf nodes form n pairs of public signing key values $pk_{0,i}=H(sk_{0,i})$ and $pk_{1,i}=H(sk_{1,i})$ for i=0, . . . , n−1.

A compressed digital signature over a message may then be generated using the generated binary trees. As a first step, the message is hashed and the hashed message is inspected the bits of the message sequentially. The first two bits of the message are inspected, and checked to see if the bits are matching (i.e., if there is a run of two consecutive zero bits or two consecutive one bits). If the bits do not match, an indicator bit is set to indicate that the bits do not match (e.g., a zero bit) concatenated with the value of the left-most leaf node corresponding to the binary value of the first bit of the hashed message (e.g., if the first bit of the hashed message is a one, then the value of s(1, 3, 0) is concatenated to the indicator bit; if the first bit of the hashed message is a zero, then the value of s(0, 3, 0) is concatenated to the indicator bit) and the value of the second-to-the-left leaf node corresponding to the binary value of the second bit of the hashed message. Conversely, if the first two bits of the message are matching, then an indicator bit is set to indicate that the bits do match (e.g., a one bit), and a shared parent of the two leaf nodes is concatenated to the indicator bit. For example, if the first two bits of the hashed message are "00" then the start of the digital signature would be a "0" indicator bit followed by the 8-bit value for s(0, 2, 0) which is the parent node for the two child nodes s(0, 3, 0) and s(0, 3, 1) that corresponding to the first and second bit positions. This process may be repeated for the next two bits (i.e., the $3^{rd}$ and $4^{th}$ bits of the hashed message) for the entire length of the hashed message.

Figure 3:
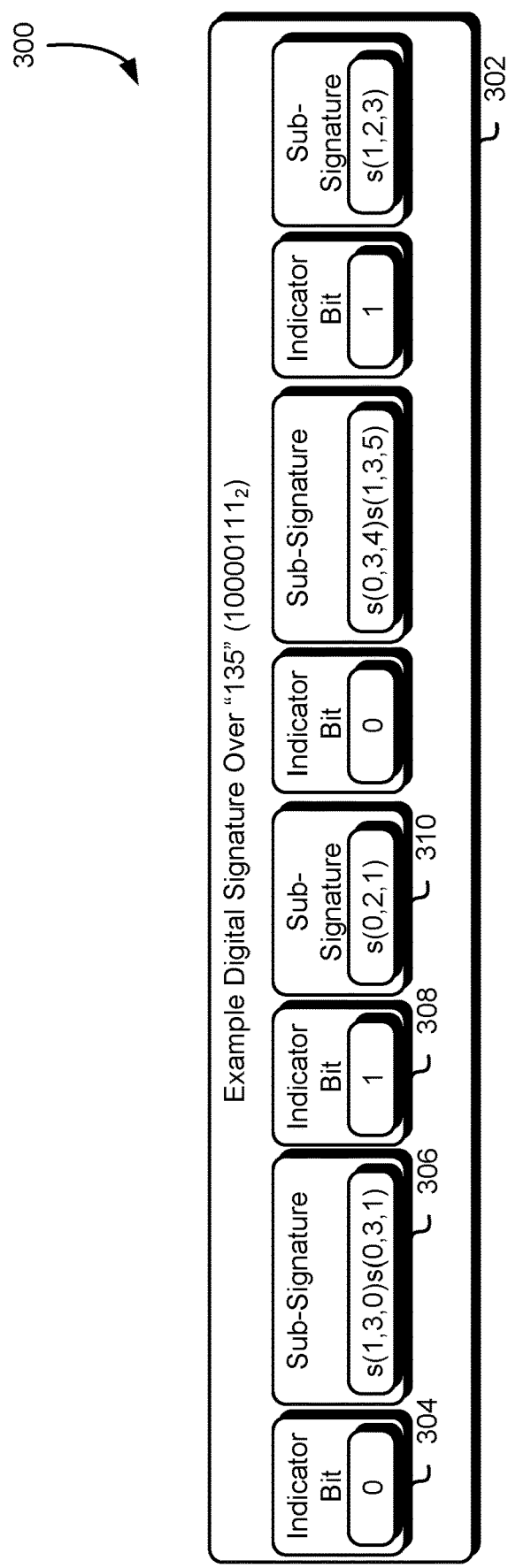
FIG. 3 shows an illustrative example of a compressed hash-based signature.

FIG. 3 illustrates an example of a compressed hash-based signature. In the diagram 300, the compressed hash-based signature may be generated in accordance with techniques described above in connection with FIG. 2. In the example digital signature 302, a hashed message has a decimal value of 135, which in binary notation is $10000111_2$. The first two bits of the hashed message are "10" which do not match, so the digital signature is generated starting with a leading "0" indicator bit 304 followed by sub-signature components 306 for the leaf node values for s(1, 3, 0) and s(0, 3, 1) as described above in connection with FIG. 2; the next two bits of the hashed message are "00" which match, so the digital signature is concatenated with a "1" indicator bit 308 indicating that the bits match followed by a sub-signature component 310 for the s(0, 2, 1) which is the parent node of s(0, 2, 2) and s(0, 2, 3) as described above in connection with FIG. 2; the next two bits of the hashed message are "01" which do not match, so the digital signature is concatenated with a "0" indicator bit and the corresponding leaf node values s(0, 3, 4) and s(1, 3, 5) as described above in connection with FIG. 2; the last two bits are "11" which match, and so an indicator bit of "1" is encoded with the parent node s(1, 2, 3) of the two leaf nodes that would have been normally encoded (i.e., s(1, 3, 6) and s(1, 3, 7)) as described above in connection with FIG. 2. Note that the sub-signature component 310 for the first two leaf nodes may be viewed as a single component (i.e., a component including two node values) or two separate components (i.e., a first component including a first node value and a second component including a second node value).

The compressed digital signature 302 can be compared favorably with systems implementing one-time signature schemes without compression. In some examples, a LD-OTS signature scheme would generate the following signature to correspond with a hashed message value of 135 ($10000111_2$):

| Signature Sub-Values | Size (bytes) |
|---|---|
| s(1, 3, 0) | 8 |
| s(0, 3, 1) | 8 |
| s(0, 3, 2) | 8 |
| s(0, 3, 3) | 8 |
| s(0, 3, 4) | 8 |
| s(1, 3, 5) | 8 |
| s(1, 3, 6) | 8 |
| s(1, 3, 7) | 8 |

As can be seen above, an uncompressed signature scheme would concatenate together eight 8-bit values, for a total of 64 bits of storage space required for a signature. In comparison, the compressed signature would be expressed as:

| Signature Sub-Values | Size (bytes) |
|---|---|
| 0, s(1, 3, 0), s(0, 3, 1) | 17 |
| 1, s(0, 2, 1) | 9 |
| 0, s(0, 3, 4), s(1, 3, 5) | 17 |
| 1, s(1, 2, 3) | 9 |

It should be readily apparent that although additional indicator bits are stored as part of the compressed signature, that the overall size of the compressed signature (52 bits) is smaller in size than the uncompressed signature (64 bits) resulting in a size reduction of 12/64=18.75%. However, it should be noted that in certain cases, the compression algorithm may generate a compressed digital signature that is larger than the uncompressed digital signature, such as where the hashed message is a series of consecutively alternating ones and zeros.

Probabilistically, the compressed digital signature will provide a space savings. The output of a hash function generates bits that are random and therefore, the probability of a sequence containing two bits consecutive matching bits (i.e., "00" or "11") is equal to the probability of two bits being different (i.e., "01" or "11"). As such, there is a 50% chance that a compression will occur based on the bits matching. The compression algorithm reduces the size of the sub-signature corresponding to the two bits by 50% (i.e., by writing one node value instead of two node values). Therefore, that the expected reduction in size is 25%. However, the compressed signature will also include an indicator bit, which will cause the expected size reduction to be slightly less than 25%. However, as the size of the signature grows, so will the compression ratio. The compression ratio may refer to the ratio between the uncompressed size and the compressed size. Space savings may refer to the reduction in size relative to the uncompressed size.

As an example, consider the 8-bit hash message described above in connection with FIG. 2. The expected compression would be as follows: for two bits of the hash message, the compressed sub-signature will, on average, be compressed 50% of the time to 8 bits (i.e., when the two consecutive bits of the hash are equal in value), whereas 50% of the time the time the sub-signature will not be compressed, and an additional indicator bit will be included as part of the compressed sub-signature. Therefore, the expected length of the sub-signature is 0.5*8 0+0.5*16+1=13 bits. A signature scheme that does not use any compression scheme would encode the sub-signature using 2*8=16 bits. Thus, the expected space savings for 8-bit hash values using the compression algorithm is 3/16=0.1875. As a second example, consider a hash message having a bitlength of 256 bits. For two bits of this hash message, the compressed sub-signature will have an expected length of 0.5*256+0.5*512+1=385 bits whereas a signature scheme that uses no compression would encode the sub-signature using 2*256=512 bits. Thus, the expected space savings for 256-bit hash values using the compression algorithm is 127/512=0.2480. As the bitlength of the hash grows, the space savings approaches 0.25 because the size of the indicator bit becomes negligible relative to the size of the signature values:

$$1 - \lim_{w \to \infty}\left(\frac{w/2 + w + 1}{2w}\right) = 0.25$$

Figure 4:
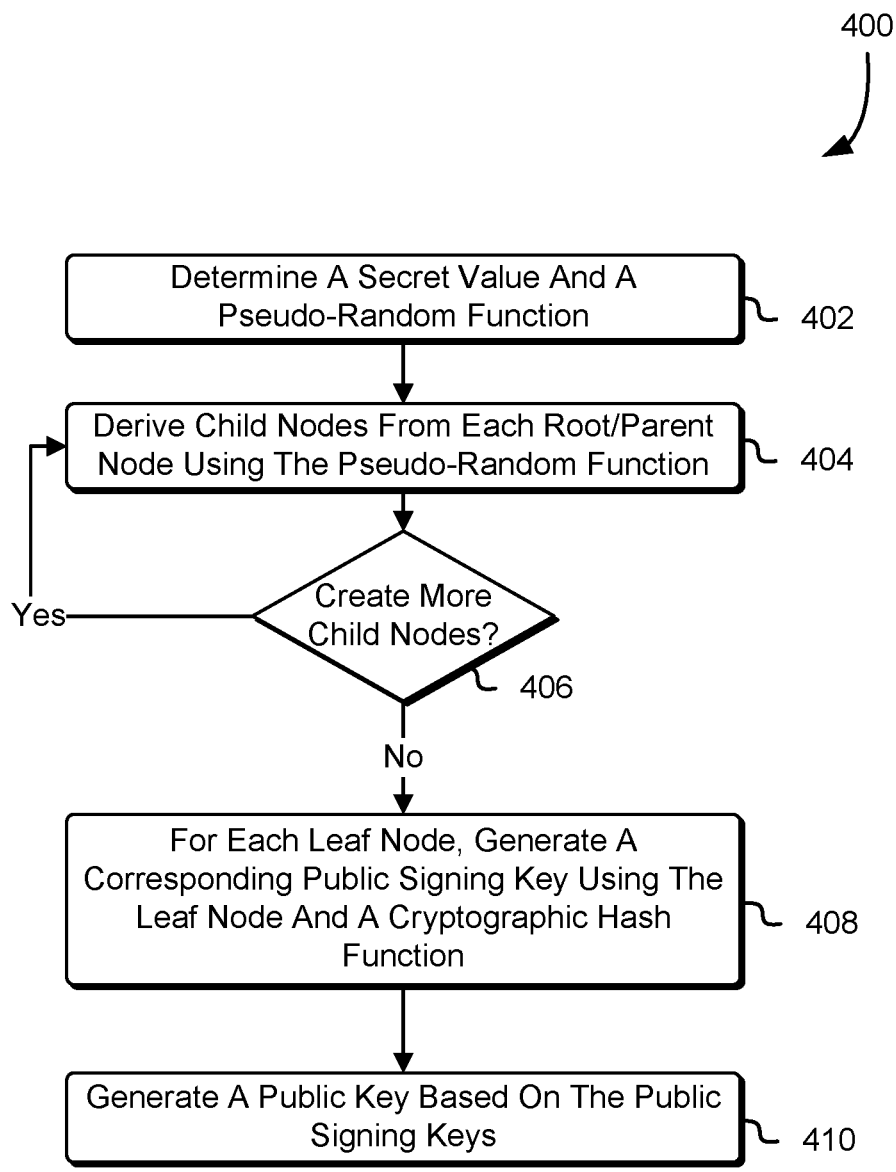
FIG. 4 shows a diagram illustrating generation of cryptographic keys that may be used for one-time signature schemes.

FIG. 4 shows an illustrative example of a process 400 for key generation in accordance with various embodiments described within this document. A computer system such as the client described above in connection with FIG. 1 may perform the process 400. The process may be used in accordance with the secret key generation scheme that uses binary trees discussed above in connection with FIG. 2. The process may be used to generate two binary trees that may be used as part of a digital signature generation process.

The system may determine 402 a secret value and a pseudo-random function. In some embodiments, the size (e.g., bitlength) of the secret value may be based at least in part on the size (e.g., bitlength) of outputs generated by a cryptographic hash function which may be used in connection with generating digital signatures. For example, in a system that generates a hash of a message using a 256-bit cryptographic hash function may generate a secret value that have a bitlength of 256-bits. The secret values may be derived using a random number generator or a pseudorandom number generator (PRNG) function. In some embodiments, a system may generate two root nodes (which may each be used to generate a hash tree) and the two root nodes may be derived from a common secret (e.g., using a pseudo-random function) or may be derived from separate secrets (e.g., using a PRNG function).

The system may derive 404 two child nodes from a root node that may be the determined secret value. A pseudo-random function may be used to deterministically generate hashed outputs based on inputs as described above in connection with FIGS. 1-3. The pseudo-random function may receive, as inputs, the root node, and additional information that correspond to a node in a tree for which the pseudo-random function output will be associated with. As an example, the left child node of the first secret s(0,0,0) may be generated using a pseudo-random function with the first secret s(0,0,0), the depth information, and an index for which node at the depth the value is being generated for. For example, the a function call PRF(s(0,0,0), 1, 0) may be used to generate the left child of the first secret and the node value may be referenced as s(0,1,0). Likewise, the right node of the first secret may be referenced as s(0,1,1)=PRF(s(0,0,0), 1, 1). The same or similar process may be performed using the second secret s(1,0,0).

After deriving the child nodes, the system may check whether 406 to create more leaf nodes or whether to stop generating leaf nodes. A system may be configured to stop generating leaf nodes when there are at least as many leaf nodes as there are bits in the message. Thus, for a message having a bitlength of 256, there may be 256 leaf nodes generated for a first binary tree of the first secret s(0,0,0) and 256 leaf nodes generated for the second binary tree of the second secret s(0,1,1). If more leaf nodes should be generated, they may be derived 404 in the same manner as described above. For example, consider an example where nodes s(0,1,0) and s(0,1,1) have been generated off of the first secret s(0,0,0) and the system determines that more leaf nodes are needed as part of the key generation process. Two child nodes may be created for the left node s(0,1,0) and two child nodes created for the right child s(0,1,1) using a pseudo-random function:

| | |
|---|---|
| s(0, 2, 0) | PRF(s(0, 1, 0), 1, 0) |
| s(0, 2, 1) | PRF(s(0, 1, 0), 1, 1) |
| s(0, 2, 2) | PRF(s(0, 1, 1), 1, 2) |
| s(0, 2, 3) | PRF(s(0, 1, 1), 1, 3) |

Child nodes at the same depth may also be generated for a second binary tree in the same or similar manner.

After generation of the child nodes, a binary trees have at least as many leaf nodes as there are bits in the message. Each leaf node may be used to generate 408 a key pair, where the value of the leaf node may be used as the private key of the key pair and the corresponding public key is a hashed output of the private key. As an example, consider the message and tree of FIG. 2—a private key $sk_{0,i}$ may refer to the i-th leaf node from the left of a first binary tree, and $sk_{1,i}$ may refer to the i-th leaf node from the left of a second binary tree. The index will be expressed herein in a 0-indexed manner (i.e., the leftmost node has an index of 0) although other indexing formats are also contemplated in the scope of this document.

The system may use a cryptographic hash function to generate the public key values. For example, in a tree having n leaf nodes where each leaf node corresponds to a private signing key, public signing keys may be generated such that $pk_{0,i}=H(sk_{0,i})$ and $pk_{1,i}=H(sk_{1,i})$ where H() refers a one-way hash function.

The private key of the system may be defined as SK=s (0,0,0), s(1,0,0) and the public key PK={($pk_{0,i}$, =0, . . . , n−1} may be generated 410 based at least in part on the leaf nodes (e.g., in conjunction with a cryptographic hash function). More generally, the public key may be a hash of each of the leaf nodes. As an example, for a 256-bit cryptographic hash function, the private key may be the root secrets concatenated together (or a single 256-bit value if the two root secrets are derived from a shared secret) and both binary trees generated will have 256 leaf nodes. A public key may include a concatenation of each of the 512 leaf nodes, resulting in a public key being 2*256*256=16 KiB in size.

While various embodiments described herein may include systems that generate a secret value having a bitlength equal to or greater than the bitlength of outputs generated by a cryptographic hash function, such need not be the case, and some embodiments may include systems that generate a secret value that is smaller than the size of outputs generated by a cryptographic hash function. Additionally, variations of the techniques for generating the hash tree and/or cryptographic key are also contemplated within this document. For example, a non-binary hash tree may be generated. A trinary hash tree may be generated by determining a secret value and deriving three child nodes, for example, through using a pseudo-random function to calculate three child node values which may be, respectively, PRF(s(0,0,0), 1, 0), PRF(s(0,0,0), 1, 1), and PRF(s(0,0,0), 1, 2). Additional nodes may be generated in the same or similar manner.

More generally, a process for key generation described above in accordance with FIG. 4 may be performed as follows:
1. Determine the bitlength of the hash function, n, and the depth of the hash tree to be generated, r, such that $2^r >= n$;
2. Perform the following steps:
   For b=0 to 1:
     Set t=1;
     Generate root s(b, 0, 0);
     For j=1 to r−1:
       For i=0 to t−1:
         Compute s(b, j, 2i)=PRF(s(b, j−1, i), j, 2i);
         Compute s(b, j, 2i+1)=PRF(s(b, j−1, i), j, 2i+1);
       Set t=2*t;
     Compute $sk_{b,2i}$=s(b, r, 2i)=PRF(s(b, r−1, i), r, 2i);
     Compute $sk_{b,2i+i}$=s(b, r, 2i+1)=PRF(s(b, r−1, i), r, 2i+1);
3. Compute n pairs of public key values $pk_{0,i}=H(sk_{0,i})$ and $pk_{1,i}=H(sk_{1,i})$ for values of i from 0 to n−1;
4. Define the private key SK={s(0, 0, 0), s(1, 0, 0)}; and
5. Define the public key PK={$pk_{0,i},pk_{1,i}$|i=0, . . . , n−1).

Figure 5:
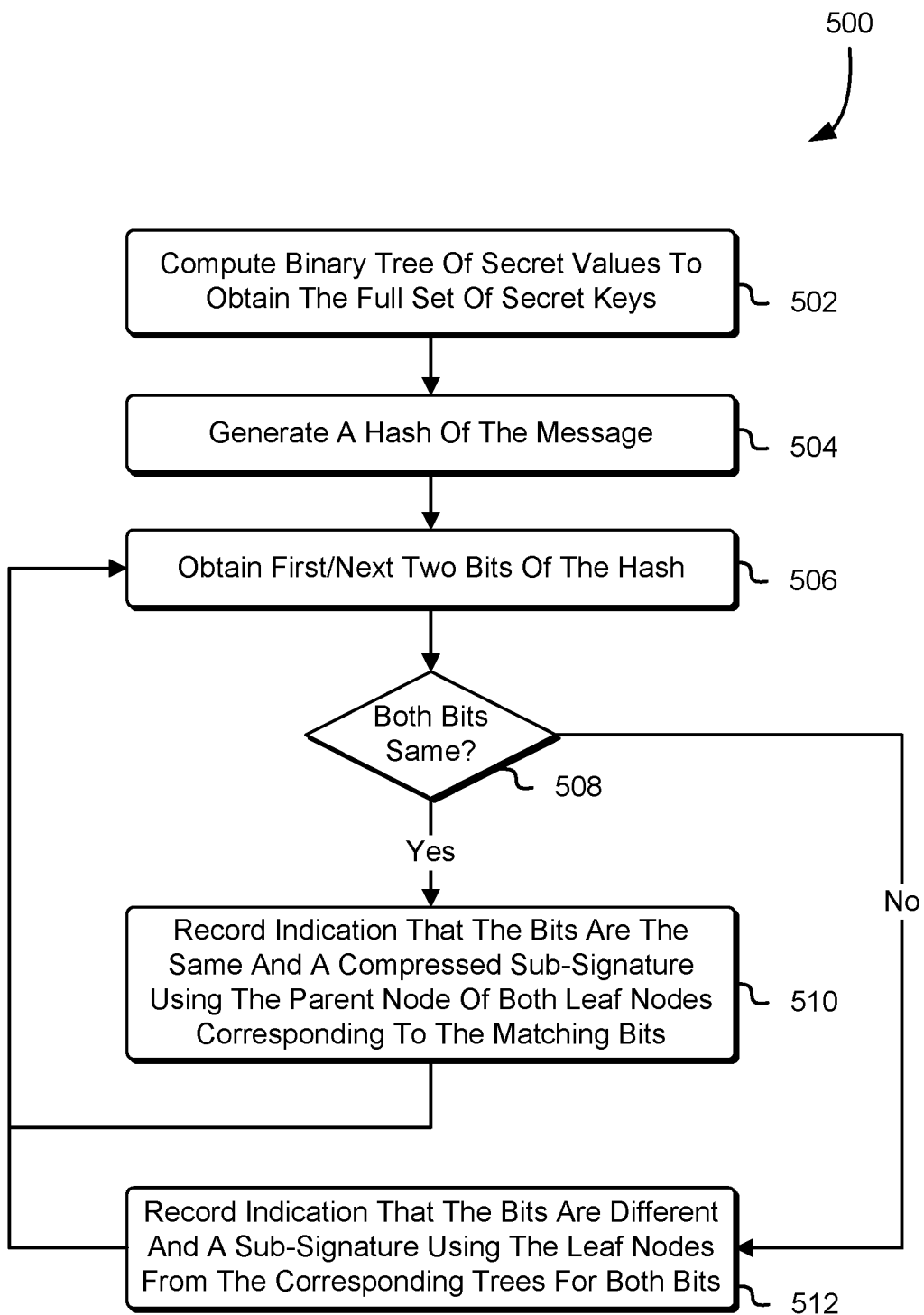
FIG. 5 shows a diagram illustrating generating compressed signatures that may be used for one-time signature schemes.

FIG. 5 shows an illustrative example of a process 500 for generating a compressed digital signature over a message in accordance with various embodiments described within this document. A computer system such as the client described above in connection with FIG. 1 may perform the process 500.

As a first step, a system may compute 502 a binary tree of secret values to obtain a set of secret keys. The computation of the binary tree may be performed in accordance with the process described above in connection with FIG. 4. In some embodiments, the system may be able to obtain a fully or partially generated binary tree, for example, from another module of a service, provided that the system has assurances that the tree was generated in a manner in which the derivation of a parent node value from a child node value is not feasible (e.g., parent nodes are inputs to a one-way hash function that generate child nodes as output). In other cases, the system may generate one or more binary trees (e.g., in the manner described above in connection with FIG. 4) at an earlier point in time and store the one or more trees in volatile or persistent storage for later use. The secret keys may refer to $sk_{b,i}$ as described above, referring to the values of the respective leaf nodes of the respective binary trees.

The system may generate 504 a hash of the message to be digitally signed. In some embodiments, the message may be of the same or smaller size as compared to a cryptographic hash function. As an example, message may be 128 bits in size and utilize a 256-bit cryptographic hash function by padding the message with leading or training bits (e.g., padding with 128 zero bits and then the 128-bit message to form a 256-bit variant of the message). The cryptographic hash function used to hash the message may be any suitable hash function that takes an input message and returns a fixed length output sometimes referred to as a message digest or a digest. The cryptographic hash function should deterministically generate an output based on a specified input, but at the same time should do so in a way that given the output of a cryptographic hash function, it should be no more likely that any value in the domain of inputs was more likely to have generated the output than another value.

The system may them obtain 506 the first two bits of the hashed message. Note that while the process described in accordance with FIG. 5 illustrates walking the hash message bit-by-bit sequentially, that walking the message sequentially bitwise is not necessary, but any association of two bits may be obtained deterministically can be used to generate a signature in accordance with FIG. 5. For example, instead of obtain the first two bits and then the next two bits (i.e., the third and fourth bits) of the message, the system could instead obtain the first and third bits and check whether they are the same value, and then obtain the second and fourth bits to check whether they are equal, and so on and so forth. In fact, any two bits may be associated together for the generation of the compressed digital signature so long as the association is made known to a party verifying the signature.

The system then checks 508 whether the two bits are the same—i.e., whether the sequence is "00" or "11". If the bits are both the same, then the system records 510 an indication that the bits are the same and also records a compressed sub-signature corresponding to the matching bits using the parent node of both leaf nodes corresponding to the matching bits. As an example, consider an 8-bit message, for example, in accordance with FIGS. 1-4. Two binary trees may be created such that each binary tree has 8 leaf nodes, and a total of 16 secret keys $sk_{b,i}$ where $b=\{0, 1\}$ and $i=\{0, \ldots 7\}$ corresponding to the nodes $s(b, 3, i)$ as shown in FIG. 2. The system may, as part of the recordation, store an indication bit (e.g., a zero bit) that indicates that the first two bits of the hash are the same value, and then store the value associated with the parent to the first two nodes which in FIG. 2 is referred to as the node $s(b, 2, 0)$ where b is zero if the first two bits of the hash message are zeroes and one if the first two bits of the hash message are ones. For example, a hashed message having a decimal value of 210 (binary value $11010010_2$) would have the following sub-signature after parsing the first two bits: $\{0, s(1, 2, 0)\}$ which denotes a zero bit concatenated with the value of the node at $s(1, 2, 0)$. It should be noted that the value of $sk_{1,0}$ and $sk_{1,1}$ can be derived from the value of the node at $s(1, 2, 0)$ by computing $PRF(s(1, 2, 0), 3, 0)$ and $PRF(s(1, 2, 0), 3, 1)$ in accordance with the key generation algorithm described above in connection with FIG. 4. The process may be repeated by obtaining 506 the next two bits of the sequence and checking 508 if those next two bits (i.e., the third and fourth bits of the hash message) are matching.

If the system checks 508 whether the first/next two bits are the same and determines that the first/next bits are different, the system will instead record 512 an indication that the bits of the hash message are different and a sub-signature corresponding to the two unmatched bits using the leaf node values from both bits, which corresponding to the secret keys for those respective positions and bits. Continuing with the previous example of generating a compressed signature for an 8-bit hashed message having a decimal value of 210 (binary value $11010010_2$), after writing the sub-signature for the first two bits, the system will check that the next two bits of the hash message are not equal because the third and fourth bits of the hash message are zero and one, respectively. The system them records 512 an indicator bit that the two bits of the hash message have different values (e.g., records a one bit) and then the respective secret keys $sk_{0,2}$ and $sk_{1,3}$ corresponding to the third bit (at index 2) of the hash message having a value of zero and the fourth bit (at index 3) of the hash message having a value of one. Thus, after parsing two pairs of bits, the partially generated signature for the hash message having a decimal value of 210 is: $\{0, s(1, 2, 0), 1, sk_{0,2}, sk_{1,3}\}$. Repeating this process two more times, the third pair of bits are matching zeros and would result the following partially generated signature: $\{0, s(1, 2, 0), 1, sk_{0,2}, sk_{1,3}, 0, s(0, 2, 2)\}$. And the completed signature, after generating the sub-signature for the last two bits of the 8-bit hashed message is:
$\{0, s(1, 2, 0), 1, sk_{0,2}, sk_{1,3}, 0, s(0, 2, 2), 1, sk_{t6}, sk_{0,7}\}$—that is, a zero concatenated with a parent node $s(1, 2, 0)$ that can be used in conjunction with a pseudo-random function to generate $sk_{1,0}$ and $sk_{1,i}$, a one-bit (i.e., an indicator value), the secret keys $sk_{0,2}$ and $sk_{1,3}$, and so on and so forth. Thus, after finishing generation of the compressed digital signature, the digital signature has a total size of: 1+8+1+8+8+1+8+1+8+8=52 bits.

More generally, a process for compressed signature generation described above in accordance with FIG. 5 may be performed as follows:
1. Obtain as inputs a private key SK and a message M;
2. Recompute the binary tree of secret values to obtain the full set of keys;
3. Hash the message $h=H(M)$, where $h_i$ is the i-th bit of the hashed message;
4. For i=0 to n/2−1:
   a. If $h_{2i}=h_{2i+1}$: Set $sig_i=\{1, s(h_{2i}, r−1, i)\}$ where r is the depth of the binary tree;
   b. Else: Set $sig_i=\{0, sk_{h2i,2i}, sk_{h,i+1,2i+1}\}$; and
5. Form the compressed signature $SIG=\{sig_i | i=0, \ldots, n/2−1\}$.

While the example Merkle trees discussed above are exemplary binary Merkle trees, any k-ary tree (i.e., a tree structure wherein each node has at most k child nodes) may be used in place of or in combination with other tree structures. For example, in some embodiments, a ternary tree (i.e., a tree structure wherein each node has at most three child nodes) may be used in place of or in addition to a binary tree. As an example, in an embodiment where a ternary tree is used, the system may check whether the first/next three bits are the same—i.e., whether the sequence is "000" or "111". If the bits are both the same, then the system records an indication that the bits are the same and also records a compressed sub-signature corresponding to the matching bits using the parent node of all three leaf nodes corresponding to the matching bits. Likewise, in decompressing a compressed signature, an indication that the bits are the same may indicate that a compressed sub-signature may be used to derive the values for three leaf node.

Figure 6:
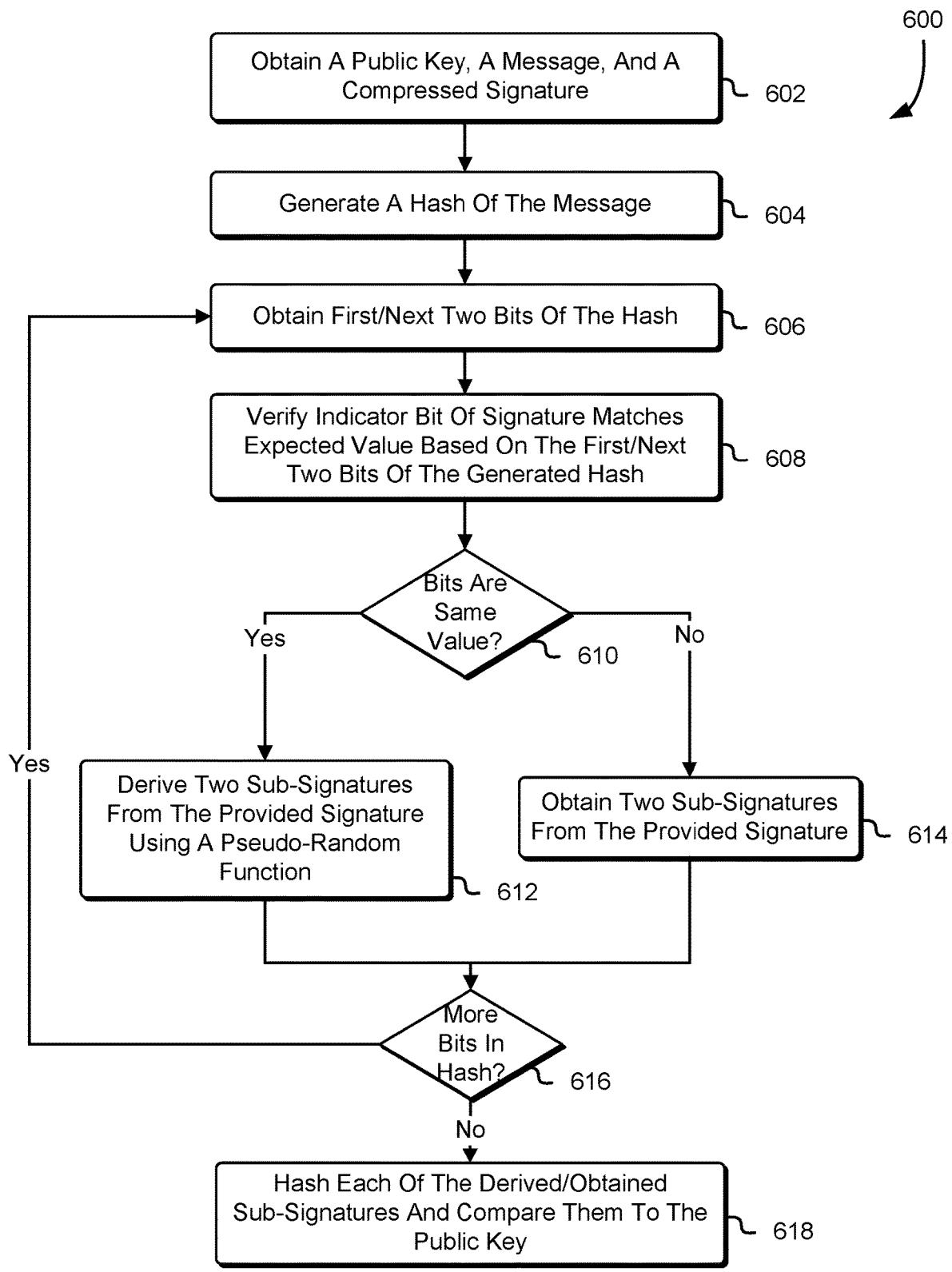
FIG. 6 shows a diagram illustrating decompressing and verifying compressed signatures that may be used for one-time signature schemes.

FIG. 6 shows an illustrative example of a process 600 for verifying a compressed signature in accordance with various embodiments described within this document. A computer system such as the client described above in connection with FIG. 1 may perform the process 600.

A system may receive 602 a public key, a message, and a compressed signature in accordance with various embodiments described above in connection with FIGS. 1-5. The process may perform a verification over the message and signature purporting to be authentic. The public key may, as described above, include a concatenation of a pair of public keys for each bit of the message. An example structure of the public key PK may be expressed as $PK=\{(pk_{0,i}, pk_{1,i}) | i=0, \ldots n−1\}$. Of course, the public key PK may be represented in other formats to encapsulate the same information, such as $PK=\{(pk_{0,i} | i=0, \ldots n−1), (pk_{i,j} | j=0, \ldots n−1)\}$. As an example, in accordance with various embodiments, a 256-bit message may have a public key that is 16 KiB in size.

Upon obtaining the message, the system may generate 604 a hash of the message, the generated hash using a one-way cryptographic algorithm being the same as the algorithm used to generate the compressed signature. The generated hash may be used in later steps to verify whether the authenticity of the provided signature. Various types of one-way cryptographic algorithms may be used in accordance with this step, including various cryptographic hash functions and pseudo-random functions.

The system may obtain 606 the first two bits of the hashed message or message digest. Of course, as described above, it is not necessarily the first two bits that are obtained, but rather any two bits associated together for the generation of the compressed digital signature so long as the association is made known to the system verifying the signature. In some embodiments, a contiguous subsection of the hashed message may be obtained, where the contiguous subsection of a hashed message refers to two or more consecutive bits of the hashed message.

The system may verify 608 the indicator bit of the signature matches the expected value based on the first two bits of the generated hash. For example, in the example in the example described above in connection with FIG. 2, an indicator bit will be zero when the two bits do not have the same value. Thus, if the first indicator bit of the provided signature is a zero, then the verification step checks that the value of the first two bits of the generated hash are not the same value (i.e., the first two bits of the hash are "01" or "10"). Conversely, if the first indication bit of the provided signature is a one, then the indicator bit indicates that the value of the first two bits of the generated hash should have the same value (i.e., the first two bits of the hash are "00" or "11"). If the indication provided by the indicator bit and the value of the first two bits in the hash are inconsistent, the authenticity of the signature cannot be attested to, and the system may determine that the message, signature, or both may be fraudulent.

The system may construct a signature as part of verifying the provided signature. If the system determined 610 that the first two bits have the same value, then the system will derive 612 two sub-signatures using the value provided after the indicator bit. For example, the first two sub-signatures that the system generates may be: $sig_0=PRF(s, r-1, h_0)$ and $sig_1=PRF(s, r-1, h_1)$ where s is the n-bit value provided after the indicator bit, n is the bitlength of the hash function, and $r=\log_2(n)$ where n is an integer power of 2. More generally, sub-signatures derive when the indicator bit indicates a matching pair of bits may be described as: $sig_{2i}=PRF(s, r-1, h_{2i})$ and $sig_{2i+1}=PRF(s, r-1, h_{2i+i})$ where s is the n-bit value provided after the indicator bit, n is the bitlength of the hash function, and $r=\log_2(n)$ where n is an integer power of 2. If the system determines 610 that the bit values are not the same, the system obtains 614 the sub-signatures $sig_{2i}$ and $sig_{2i+1}$ from the next 2*n bits following the indicator bit, respectively.

If the system determines 616 there are more bits in the hash, then the next two bits are obtained 606 and the process repeated until sub-signatures are generated for the entire hashed message. When the system determines 616 there are no more bits in the hash, the system will have generated $sig_i$ for i=0, ... n−1—in other words, a generated signature for each bit of the hashed message. Each derived or generated sub-signature may be hashed 618 by a cryptographic hash function to obtain a public key $PK'_i=H(sig_i)$ for i=0, ... n−1 where HO is a cryptographic hash function. The corresponding generated public keys may be compared against the provided public keys to determine whether the signature should be verified. If each provided $PK_i$ is equal to each generated $PK'_i$ for i=0, ... n−1 then the verification succeeds. $PK_i$ may refer to either $pk_{0,i}$ if $h_i$ has a binary value of zero and $pk_{1,i}$ if hi has a binary value of one.

More generally, a process for compressed signature generation described above in accordance with FIG. 6 may be performed as follows:
1. Obtain PK={$(pk_{0,i}, pk_{1,i})$|i=0 to n−1}, an n-bit message M, and a signature value SIG;
2. Generate a hashed message h=H(M) where $h_i$ is the i-th bit of the output;
3. For i=0 to n/2−1:
   a. If $h_{2i}=h_{2i+1}$:
      i. If $sig_i \neq \{1, s\}$ for some n-bit value s, return FAIL;
      ii. Derive $sig_{2i}=PRF(s, r-1, h_{2i})$;
      iii. Derive $sig_{2i+1}=PRF(s, r-1, h_{2i+1})$;
   b. Else:
      i. If $sig_i \neq \{0, s, t\}$ for some n-bit values s and t, return FAIL;
      ii. Set $sig_{2i}=s$;
      iii. Set $sig_{2i+1}=t$;
4. Compute the values $PK'_i=\{H(sig_i)$ for i=0 to n−1};
5. If $PK'_i$ is equal to $PK_i$ for all i=0 to n−1: return SUCCESS;
6. Else: return FAIL.

Note that returning FAIL refers to an indication that the system was unable to verify that the signature is authentic for one reason or another, and not necessarily that the routine failed to run.

Figure 7:
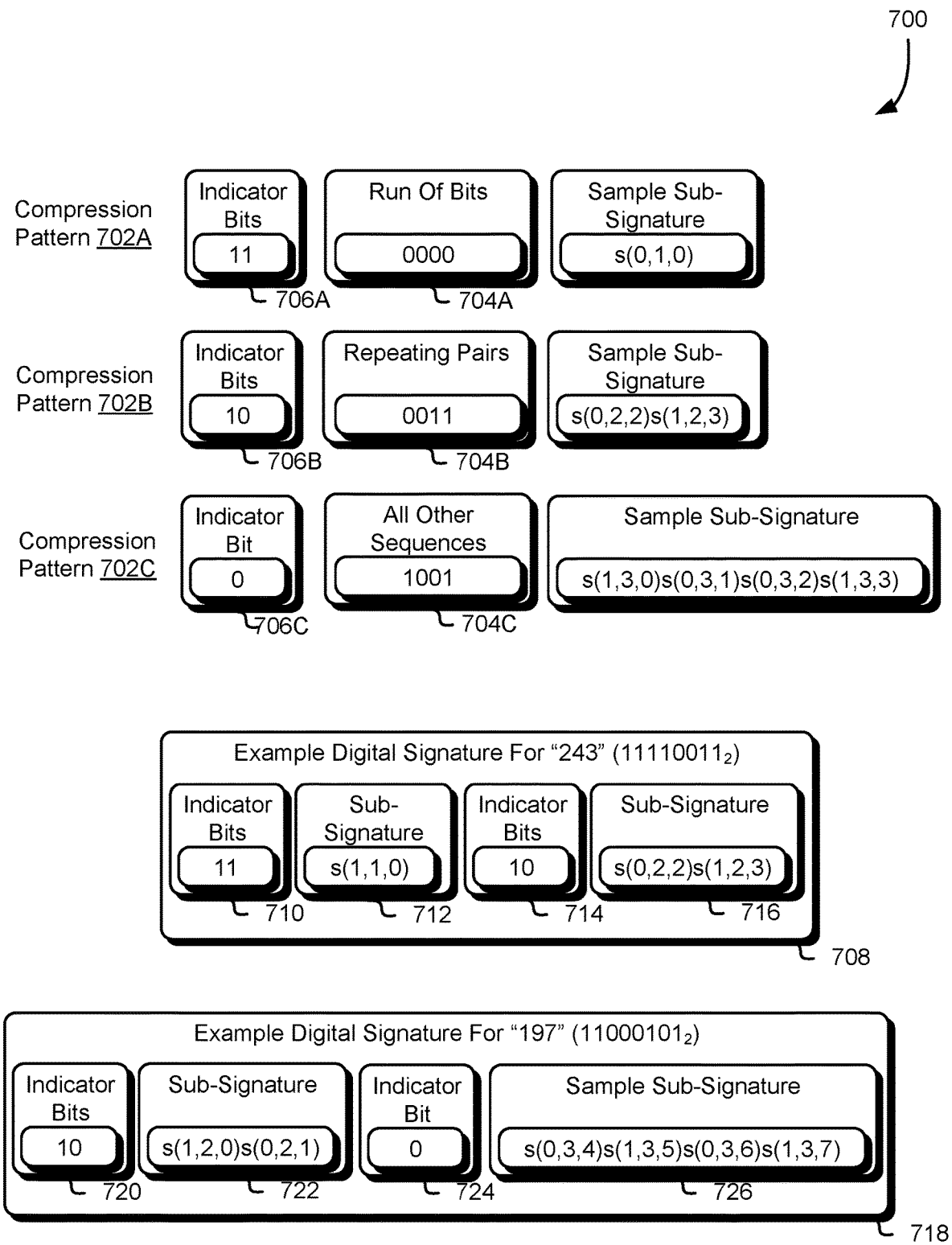
FIG. 7 shows an illustrative example of a compressed hash-based signature with multiple compression patterns.

FIG. 7 illustrates a diagram 700 showing a compressed hash-based signature scheme with multiple compression patterns. The compression algorithm shown in accordance with FIG. 7 may be implemented using the same or similar binary tree as described above in connection with FIGS. 1-4, but uses a modified algorithm for generating a compressed digital signature and verifying the compressed digital signature.

As part of generating a compressed digital signature, the system may compute binary trees and a hashed message in the same or similar manner as described above in connection with FIGS. 1-6. The system may then obtain the first k bits of the hash and determine whether the first k bits of the hash match any of the compressed patterns. As an example, consider the generation of a compressed digital signature 708 for the 8-bit hashed message having a decimal value of 243 ($11110011_2$). The system may obtain the first four (k=4) bits of the hash and determine that it is a run of bits (i.e., all four of the bits are the same value) and therefore the pattern is compressible using the first compression pattern 702A. The first compression pattern indicates a description 704A of the pattern and a compression technique, and one or more indicator bits 706A that correspond to the pattern. Upon detecting that the first compression pattern 702A may be used, the indicator bits 710 are encoded and a sub-signature 712 is generated. The compression technique may indicate that all four bits of the particular pattern can be derived from a common grandparent, the single 8-bit value corresponding to that node may be provided and used to derive the four bits. Thus, returning to the example, the system may, for the first four bits, generate a sub-signature as {11, s(1, 1, 1)}. Continuing with the example, the system may obtain the next four (k=4) bits of the hash and determine that it matches the second compression pattern 702B. The second compression pattern indicates a description 704B of the pattern and a compression technique, and one or more indicator bits 706B that correspond to the pattern. The second compression pattern indicates a description 704B of the pattern as being two repeating pairs of bits (i.e., for a 4-bit pattern, "0011" or "1100"). The description 704B may further indicate a compression technique for compressing the pattern, which would include the use of two sets of parents that may be used to derive the first pair and second pair of bits in the 4-bit sequence, respectively. Continuing with the example, the system may, for the next four bits, obtain the parent for the two pairs of bits (e.g., in the manner described above in connection with FIGS. 1-6) and generate a sub-signature 716 with the indicator bits 714 followed by the compressed pattern {10, s(0, 2, 2), s(1, 2, 3)}. The full signature for the example would therefore be: {11, s(1, 1, 1) 10, s(0, 2, 2), s(1, 2, 3)}. The total size for the compressed signature of this particular example is 2+8+2+8+8=28 bits.

However, in some cases, no compression pattern will match, and a default pattern 702C may be used, which will also have one or more indicator bits 706C and, optionally, a description 704C of the default pattern. In some embodiments, the description 704C of the default pattern may be that it is to be used where no compression pattern applies. Consider a different example, where a compressed digital signature 718 is to be generated for a hashed message having a decimal value of 197 ($11000101_2$). The first four bit pattern will be detected as a repeating pair, and a sub-signature 722 {10, s(1, 2, 0), s(0, 2, 1)} may be generated in addition to indicator bits 720 corresponding to the pattern. However, the next four bits do not match any compression pattern, and therefore the default pattern will be used. The default pattern encodes the indicator bit 724 and a sub-signature 726 using the leaf nodes from the corresponding binary tree for all the bits. In the current example, the full signature would therefore be: {10, s(1, 2, 0), s(0, 2, 1), 0, s(0, 3, 4), s(1, 3, 5), s(0, 3, 6), s(1, 3, 7)}. Note that in some embodiments, the indicator bits for all patterns may be the same size in bits, but in other embodiments they may be of different lengths. Note that in FIG. 7, the default pattern has an indicator bit that is 1-bit in size, whereas the two patterns have indicator bits that are two bits in size.

Verification of the compressed digital signature may be performed using various techniques and may modify the process described above in connection with FIG. 6. As with the process described in FIG. 6, a system may receive a public key, a message, and a signature compressed in accordance with FIG. 7. The system may generate a hash of the message, and then obtain the first k bits of the hash message. The k bits of the hash message may be used to determine the number of indicator bits and the expected value(s) of the indicator bit(s). In FIG. 7, if the first k bits are a run of bits (i.e., all the same value) then the first two bits in the provided signature should match the indicator bits for the pattern ("11"); if the first k bits are alternating pairs, the first two bits of the signature should match the indicator bits for pattern ("10"); if the first k bits do not match any pattern, then only the first bit of the signature should match the indicator bit ("0"). After verifying that the indicator bit(s) are correct, the system may use the compression pattern corresponding to the indicator bit to derive the sub-signatures. For example, in the case of a run of bits, the compression pattern may indicate that the system should read the next n-bits of the provided signature, calculate two values using a pseudo-random function, and then generate two sub-signatures from each of the two outputs of the pseudo-random function. Alternatively, in the case of alternating pairs of bits, the compression pattern may indicate that the system should read the next 2*n-bits to obtain two 8-bit values s and t, and derive two sub-signatures from s using a pseudo-random function and derive two sub-signatures from t using a pseudo-random function. In the case of a default pattern, the system may read the next 4*n-bits to obtain four sub-signatures. Finally, the system may generate and verify a public key $PK'_i$ in the same manner as described above in connection with FIG. 6 to verify the provided signature.

It should be noted that the phrase "one-way function" includes functions that are not necessarily one-way in the strict mathematical sense, but that exhibit properties (such as collision resistance, preimage resistance and second preimage resistance) that render the function useful in contexts in which the various techniques of the present disclosure are applied. In this manner, an entity with output of the function but without access to the corresponding input, is unable to determine the input without, for instance, extraordinary expenditure of computational resources necessary for a cryptographic (e.g., brute force) attack. One-way functions (also referred to as "effectively one-way functions") include, but are not limited to, cryptographic hash functions such as message authentication codes, (e.g., hash based message authentication code (HMAC)), key derivation functions, such as PBKDF2 and bcrypt (with the password being based at least in part on the plaintext and the cryptographic key, e.g.) and other secure randomization functions which may, but do not necessarily, have a domain (set of possible inputs) that is larger than their range (possible outputs). Other suitable functions (referred to as "f") for various embodiments include, but are not limited to, functions that take at least a plaintext and cryptographic key as input and that have a property of preimage resistance (given a value y, the probability of randomly generating an input x such that $f(x)=y$ is below a specified threshold), second preimage resistance (given an input $x_1$, the probably of randomly generating another input $x_2$, different from $x_1$, such that $f(x_1)=f(x_2)$ is below a specified threshold) and/or collision resistance (the probability of two different inputs resulting in the same output is less than a specified threshold). The exact threshold for each probability may be context-dependent, with lower probabilities corresponding to higher security contexts. Hash functions usable as one-way functions in accordance with the techniques of the present disclosure include, but are not limited to, functions described in the National Institute of Standards and Technology (NIST) Special Publication 800-107, Revision 1 "Recommendation for Applications Using Approved Hash Algorithms," which is incorporated herein by reference. One-way functions may include, but are not limited to, cryptographic functions that accept at least a plaintext and a cryptographic key as inputs and generate at least a ciphertext as an output (e.g., an encryption function). The output may be such that an entity with the output of the cryptographic operation is unable, without access to particular secret information, determine the input without performing an extraordinary expenditure of computing resources. For example, a one-way function may include an RSA encryption function such that the RSA encryption function accepts as inputs a plaintext and a public key and generates a ciphertext output that an entity without the corresponding private key is unable to solve in a feasible manner. While the input may be determinable to an entity without the private key through performing an integer factorization (e.g., a prime factorization), no known algorithm exists to solve the integer factorization problem in polynomial time using conventional computer systems. A one-way function may be used to perform a cryptographic derivation such that an input to the one-way function may be used to cryptographically derive an output in a manner that an entity without access to the corresponding input may not be able to determine the input without extraordinary expenditure of computational resources. An extraordinary expenditure of computational resources may refer to using computational resources to perform a computation whose run time is not known to have an upper bound that can be represented by a polynomial expression.

Figure 8:
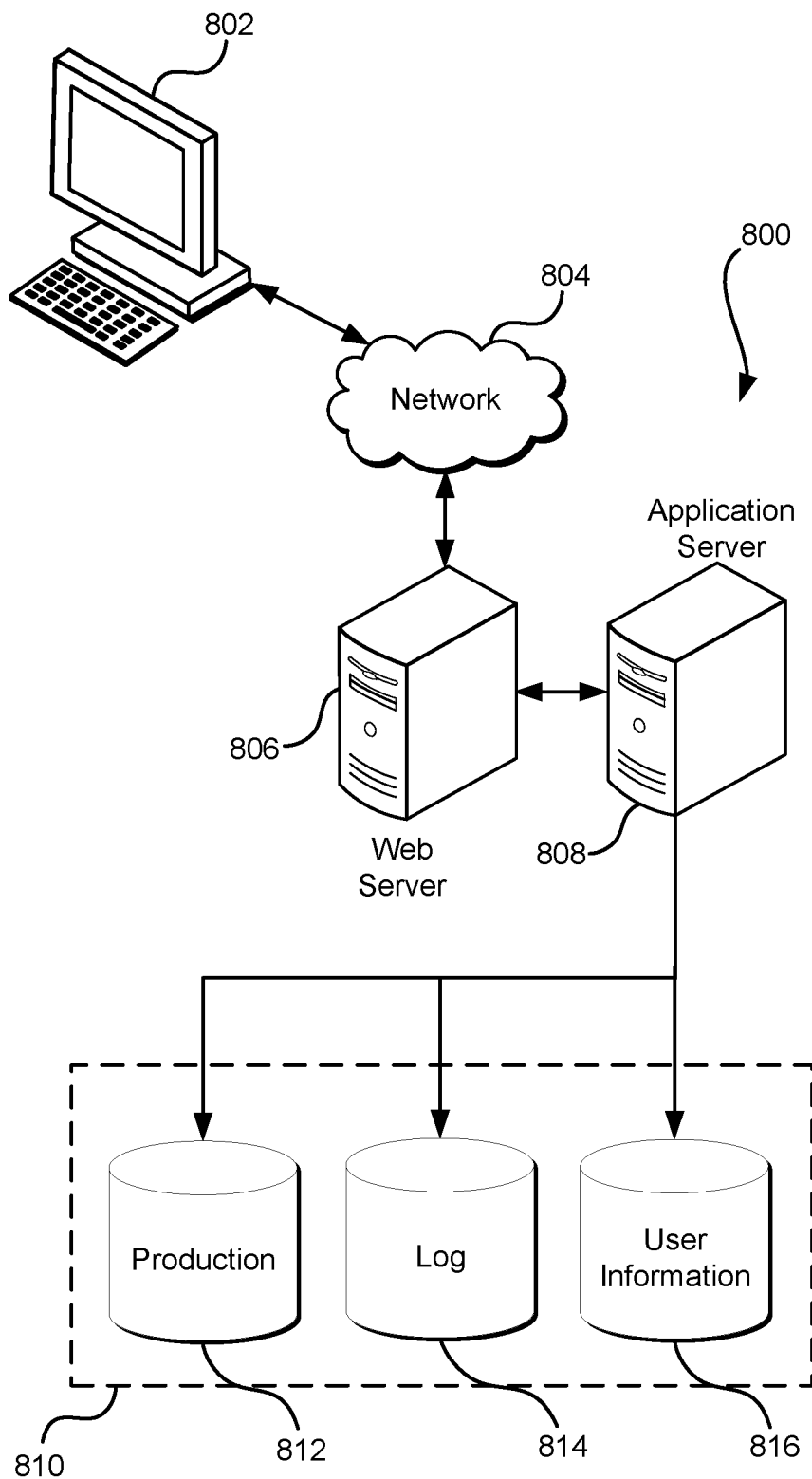
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages, or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 802 and the application server 808, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C #, or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
obtaining a message and a compressed digital signature, the compressed digital signature comprising:
a value of a parent node of a hash tree; and
an indicator that the node encodes a plurality of components of a decompressed digital signature;
determining a plurality of values based at least in part on the message, the plurality of values comprising a first value that maps to a first leaf node that is cryptographically derivable from the parent node and a second value that maps to a second leaf node that is cryptographically derivable from the parent node;
verifying the first value and the second value match;
cryptographically deriving a first component and a second component of the decompressed digital signature based at least in part on the value of the parent node; and
verifying authenticity of the message based at least in part on the decompressed digital signature.

2. The computer-implemented method of claim 1, further comprising:
obtaining a public key; and
the verifying of the authenticity of the message based at least in part on the decompressed digital signature comprises:
computing a verification value by at least:
hashing the first component of the decompressed digital signature to generate a first portion of the verification value;
hashing the second component of the decompressed digital signature to generate a second portion of the verification value; and
verifying the public key and verification value matching.

3. The computer-implemented method of claim 1, wherein the indicator value of the parent node is a one-bit value.

4. The computer-implemented method of claim 1, wherein the compressed digital signature is in accordance with a one-time hash-based signature scheme.

5. A system, comprising:
one or more processors; and
memory storing instructions that, as result of execution by the one or more processors, cause the system to:
obtain a message and a compressed digital signature, the compressed digital signature comprising:
a value of a parent node of a hash tree; and
an indicator that the node encodes a plurality of components of a decompressed digital signature;
determine a plurality of values based at least in part on the message, the plurality of values comprising a first value that maps to a first leaf node that is cryptographically derivable from the parent node and a second value that maps to a second leaf node that is cryptographically derivable from the parent node;
verify the first value and the second value match;
cryptographically derive a first component and a second component of the decompressed digital signature based at least in part on the value of the parent node; and
verify authenticity of the message based at least in part on the decompressed digital signature.

6. The system of claim 5, wherein the compressed digital signature is in accordance with a hash-based signature scheme.

7. The system of claim 6, wherein the hash-based signature scheme is a Lamport-Diffie One-Time Signature (LD-OTS) scheme or a Winternitz One-Time Signature (W-OTS) scheme.

8. The system of claim 5, wherein the instructions to determine the plurality of values based at least in part on the message, the plurality of values comprising the first value that maps to the first leaf node that is cryptographically derivable from the parent node and the second value that maps to the second leaf node that is cryptographically derivable from the parent node include instructions that, as a result of execution, cause the system to:
compute a hash of the message, wherein the hash is the plurality of values;
obtain a portion of the hash;
on a condition that a pattern is detected in the portion of the hash:
compute the first component using a pseudo-random function; and
compute the second component using the pseudo-random function; and
on a condition that the pattern is not detected in the portion of the hash: obtain the first component and the second component from the compressed digital signature.

9. The system of claim 8, wherein:
the portion of the hash is a two-bit portion of the hash; and
the pattern is detected as a result of bits of the portion of the hash matching.

10. The system of claim 8, wherein each component of the plurality of components of the decompressed digital signature has a length equal to or greater than the message's length.

11. The system of claim 5, wherein the value of the indicator encodes a depth of the hash tree.

12. The system of claim 5, wherein the indicator and the value of the parent node included as part of the compressed digital signature are concatenated.

13. A non-transitory computer-readable storage medium comprising executable instructions that, as a result of being executed by one or more processors of a computer system, cause the computer system to at least:
obtain a message and a compressed digital signature, the compressed digital signature comprising:
a value of a parent node of a hash tree; and
an indicator that the node encodes a plurality of components of a decompressed digital signature;
determine a plurality of values based at least in part on the message, the plurality of values comprising a first value that maps to a first leaf node that is cryptographically derivable from the parent node and a second value that maps to a second leaf node that is cryptographically derivable from the parent node;
verify the first value and the second value match;
cryptographically derive a first component and a second component of the decompressed signature based at least in part on the value of the parent node; and
verify authenticity of the message based at least in part on the decompressed digital signature.

14. The non-transitory computer-readable storage medium of claim 13, wherein the compressed digital signature is in accordance with a one-time hash-based signature scheme.

15. The non-transitory computer-readable storage medium of claim 13, wherein the indicator is a one-bit indicator value.

16. The non-transitory computer-readable storage medium of claim 13, wherein length of the first component is derivable from a value of the indicator.

17. The non-transitory computer-readable storage medium of claim 13, wherein the first component of the compressed digital signature is a contiguous subsection of the compressed digital signature.

18. The non-transitory computer-readable storage medium of claim 13, wherein each component of the plurality of components of the decompressed digital signature has a length equal to or greater than the message's length.

19. The non-transitory computer-readable storage medium of claim 13, wherein the instructions further cause the computer system to at least:

cryptographically derive a first child node of the parent node; and cryptographically derive the first leaf node and the second leaf node from the first child node.

20. The non-transitory computer-readable storage medium of claim 13, wherein the plurality of components includes at least three components.

\* \* \* \* \*